United States Patent [19]
Galler et al.

[11] Patent Number: 5,649,283
[45] Date of Patent: Jul. 15, 1997

[54] PROGRAM VERIFICATION FOR CABLE TELEVISION AT A CONSUMER LOCATION

[75] Inventors: Bruce I. Galler, Boulder; Jamie C. Su; Stephanie M. Zwolinski, both of Westminster, all of Colo.

[73] Assignee: Lucent Technologies Inc., Murray Hill, N.J.

[21] Appl. No.: 535,417

[22] Filed: Sep. 28, 1995

[51] Int. Cl.⁶ ................................................. H04N 7/173
[52] U.S. Cl. .......................... 455/2; 455/5.1; 348/1; 348/12; 348/460
[58] Field of Search ................................ 348/1, 2, 4, 5, 348/6, 12, 13, 460, 180, 184, 192, 907; 455/2, 3.1, 5.1, 6.1, 6.2, 6.3, 67.1, 67.3; H04N 7/16, 7/173, 7/08

[56] References Cited

U.S. PATENT DOCUMENTS

| | | | |
|---|---|---|---|
| 4,450,531 | 5/1984 | Kenyon et al. | 364/604 |
| 4,639,779 | 1/1987 | Greenberg | 348/460 |
| 4,673,976 | 6/1987 | Wreford-Howard | 348/12 |
| 4,697,209 | 9/1987 | Kiewit et al. | 348/1 |
| 4,967,273 | 10/1990 | Greenberg | 348/460 |
| 5,019,899 | 5/1991 | Boles et al. | 348/1 |
| 5,200,822 | 4/1993 | Bronfin et al. | 348/460 |
| 5,319,453 | 6/1994 | Copriviza et al. | 348/1 |
| 5,574,495 | 11/1996 | Caporizzo | 348/12 |

*Primary Examiner*—John K. Peng
*Assistant Examiner*—Chris Grant
*Attorney, Agent, or Firm*—John C. Moran

[57] ABSTRACT

Verifying that a correct program is being received and displayed on a television set of a consumer. In addition, video quality is checked to assure that transmission has not degraded the video quality. When the consumer requests a program by transmission of a message via a controller in a set top box to a system computer controlling a cable television system, the system computer sends the necessary commands to cause the requested program to be communicated to the consumer site and also transmits to the controller in the set top box a start time of the requested program and information defining the initial video content of that program. At the start time, the controller verifies that the initial video content is being received and that the consumer has the set top box correctly tuned. The controller uses a frame grabber circuit at the consumer site to grab the initial portion of the program and then to analyze the stored portion with respect to the initial video content. If the stored portion is not the same as the initial video content, the controller transmits an error message to the system computer. In response to the error message, the system computer corrects the switching or transmission problem so that the correct program is being sent to the consumer site. The system computer then verifies that the correct program is being received.

18 Claims, 5 Drawing Sheets

PROGRAM VERIFICATION FOR CABLE TELEVISION AT A CONSUMER LOCATION

TECHNICAL FIELD

This invention relates to the provision of programs communicated via a cable television system, and in particular, to the verification that the correct program is being received by the television at the consumer site.

BACKGROUND OF THE INVENTION

Cable television systems have made possible the transmission of many channels of television programs to the home of the consumer. In most cable television systems, a special converter commonly referred to as the set top box is used at the consumer location to allow the consumer to select among the various available channels and to unscramble premium channels for which extra charges are made. Certain of these premium programs can be very expensive. For example, a premier sporting event can have a large fee associated with watching it. A problem facing the operators of cable television systems is that of assuring that a consumer who has ordered a premium program is indeed receiving that program. If the consumer is not receiving the premier program, steps must be immediately taken to assure that the consumer receives the correct program. In addition, there is also the problem that the consumer may not be operating their television set correctly in order to receive the program via the cable television system but believe that there is a problem. In addition, the ability to diagnose precisely when the incorrect delivery of a program occurred and to capture such data digitally for later analysis allows the operator of the cable television system to resolve conditions that are causing incorrect delivery of programming.

SUMMARY OF THE INVENTION

The foregoing problems are solved and a technical advance is achieved by an apparatus and method for verification that a correct program is being received and displayed on a television set of a consumer. In addition, video quality is checked to assure that transmission has not degraded the video quality. When the consumer requests a program by transmission of a message via a controller in a set top box to a system computer controlling a cable television system, the system computer sends the necessary commands to cause the requested program to be communicated to the consumer site and also transmits to the controller in the set top box a start time of the requested program and information defining the initial video content of that program. At the start time, the controller verifies that the initial video content is being received and that the consumer has the set top box correctly tuned. Advantageously, the controller uses a frame grabber circuit at the consumer site to grab the initial portion of the program and then to analyze the stored portion with respect to the initial video content. If the stored portion is not the same as the initial video content, the controller transmits an error message to the system computer. In response to the error message, the system computer corrects the switching or transmission problem so that the correct program is being sent to the consumer site. To verify that the correct program is being received, the system computer transmits a message to the controller instructing it to store a frame after some predefined amount of time. Since the program is in progress, the system computer does not necessarily know what the video content will be at the designated time and cannot send the video content information out until after the designated time. After that designated time has passed, the system computer transmits to the controller new video content information defining what the controller should have received at the designated time. If the new video content information is not the same as the stored frame, the verification controller once again transmits an error message to the system computer. If the controller finds the consumer has tuned the set top box to a channel other than the channel on which the premium program is being transported, the controller displays a text message on the television set indicating to the consumer that the consumer has the set top box mistuned. The controller does not change the channel selected by the consumer automatically since the consumer may want to watch a channel other than the channel transporting the premium program.

DETAILED DESCRIPTION

Figure 1:
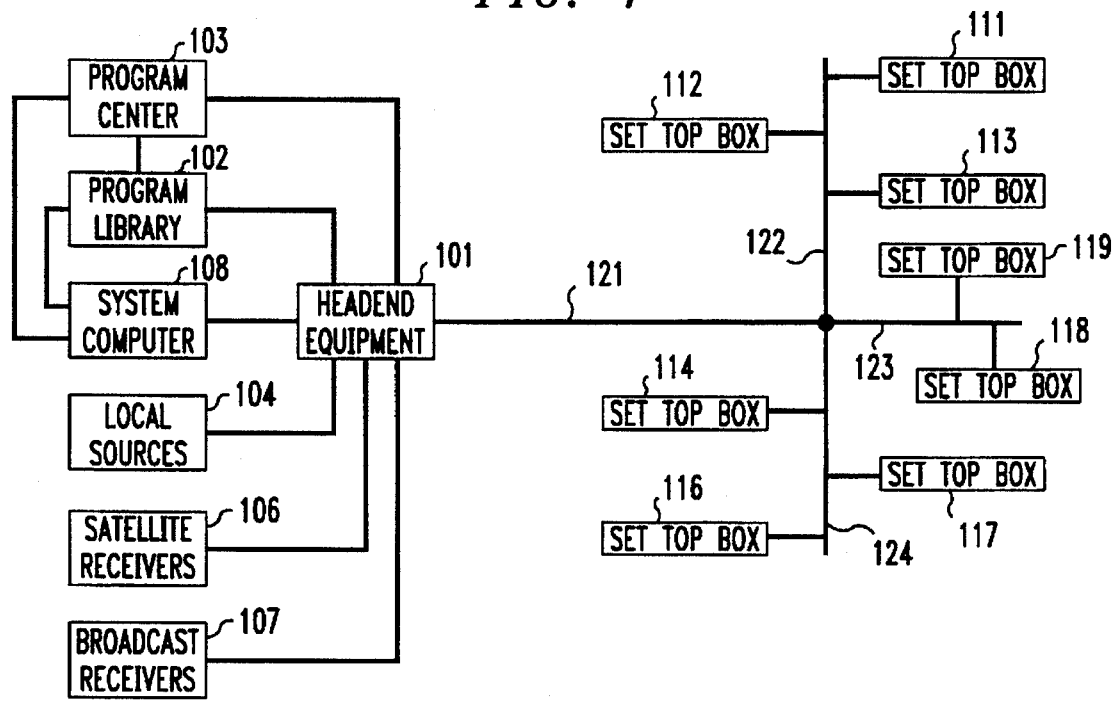
FIG. 1 illustrates, in block diagram form, a cable television system.

FIG. 1 illustrates a cable television system where the programming under control of system computer 108 is communicated to the set top boxes 111–119 via headend equipment 101. From headend equipment 101, the selected programming is communicated via a distribution network consisting of feeder 121 and branches 122–124. Feeder 121 and branches 122–124 can be coaxial cable, optical fiber cable, combinations of the two, or other transport equipment. The programs may be received from local broadcasts by broadcast receivers 107, from communication satellites via satellite receivers 106, or directly from local sources 104. In addition, system computer 108 can receive programming material from such sources as program center 103 or program library 102. Program library 102 contains stored versions of movies, musical selections, text, pictorial information, and other material that may be accessed by the customers of the cable television system illustrated in FIG. 1. Program center 103 may be a direct source of program material for system computer 108 to utilize via headend equipment 101 or may prepare such information for storage in program library 102. Program center 103 and program library 104 may be in the same or different locations and may themselves be connected to headend equipment 101 and system computer 108 by separate networks. In addition, program library 102 may consist of a number of libraries in different locations. Because of this complexity in the sources of programming that are utilized by system computer 108 via headend equipment 101, the possibility of a consumer receiving the incorrect program is greatly increased.

The set top boxes can communicate with system computer 108 via the feeders and branches and headend equipment 101. When system computer 108 transmits a message to a set top box, this is called a downlink message. When a message is sent from a set top box to system computer 108, this is called an uplink message. There are a variety of system protocols that allow the transmission of uplink and downlink messages. U.S. Pat. No. 5,373,288 which is hereby incorporated by reference discloses a digital protocol that uses well known compression techniques to transmit premium programs. The spectrum on the cable network is grouped into standard programs that are provided to all consumers via cable channels each comprising a fixed amount of bandwidth. Premium programming is provided by packetizing the premium programming and transmitting over one or more of the fixed bandwidth channels. Each of these digitized channels allows for the transmission of uplink and downlink messages. U.S. Pat. No. 5,355,480 which is hereby incorporated by reference discloses a system that uses analog channels on the cable network for all programming and reserves two of these channels for messaging purposes. One channel is for downlink messages, and the other channel is for uplink messages. The present invention can be utilized with either of these two methods.

Figure 2:
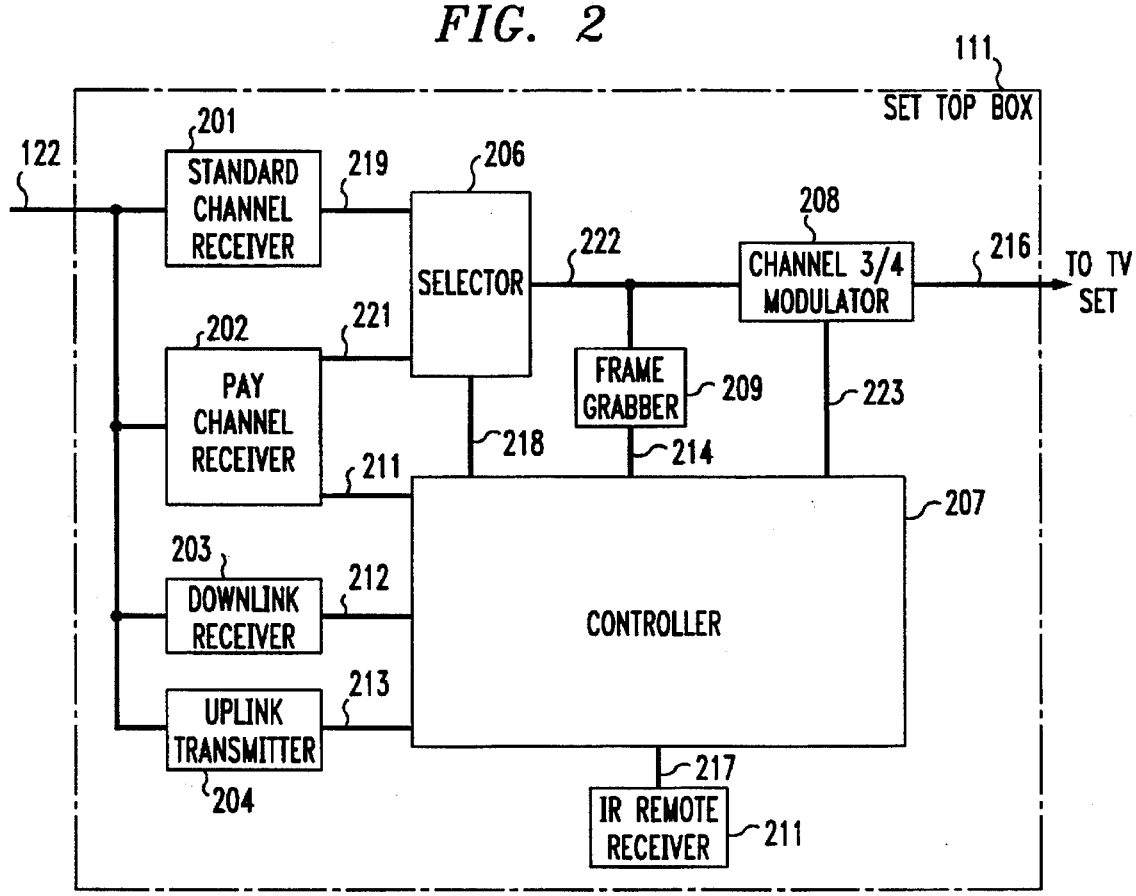
FIG. 2 illustrates, in block diagram form, the details of a set top box.

FIG. 2 illustrates in greater detail the structure of set top box 111. The other set top boxes are similar in construction. Controller 207 is responsive to commands received from the user via IR remote receiver 211 on cable 217 to control selector 206 via cable 218 to select one of the standard channels being received via standard channel receiver 201. The output of selector 206 is transmitted via cable 222 to channel 3/4 modulator 208 which remodulates the signal to either channel 3 or 4 for transmission to the television set via cable 216. In order to receive the premium programs, controller 207 must receive a message from system computer 108 via downlink receiver 203 and a command from the user via IR remote receiver 211. Upon receipt of the message and command, controller 207 may have to transfer information to pay channel receiver 202 depending on the manner in which the premium programs are transmitted to set top box 111, and controller 207 controls selector 206 to receive the program from pay channel receiver 202.

Consider now the verification of program content and quality. Upon receipt of a request from the user of set top box 111 to receive a particular premium program, system computer 108 of FIG. 1 properly initializes headend equipment 101 to obtain the program from elements 102–107 and transmits to controller 207 via downlink receiver 203 the initial portion and time that the premium program will start. After the time has elapsed, controller 207 utilizes frame grabber 209 to grab a frame being transmitted via cable 222 to channel 3/4 modulator 208. Controller 207 then analyzes the frame in comparison to the initial program information quality parameters downloaded from system computer 108. If the frame grabbed from cable 216 matches the predefined program portion received from system computer 108 and has acceptable quality, controller 207 takes no action. However if there is not a match or quality is poor, controller 207 transmits an error message to system computer 108 via uplink transmitter 204. In response to the error message, system computer transmits to controller 207 a time period after which controller 207 is to grab another frame. System computer 108 then corrects the problem of program delivery to the consumer. After the period of time has elapsed, system computer 108 utilizes a frame grabber in headend equipment 108 to grab a frame of the premium program. System computer 108 then analyzes and transmits that frame to controller 207 which compares it with the frame grabbed by frame grabber 209 at the same time. If there is agreement and acceptable quality, controller 207 takes no more action. However if there is not agreement in the program content or the quality is poor, controller 207 once again transmits an error message to system computer 108.

Controller 207 can compare the frame grabbed by frame grabber 209 and the video information received from system computer 108 utilizing a full frame comparator such as set forth in computer program sold by Matrox Inc. or use the signature method set forth in U.S. Pat. No. 4,739,398 which is hereby incorporated by reference.

Figure 3:
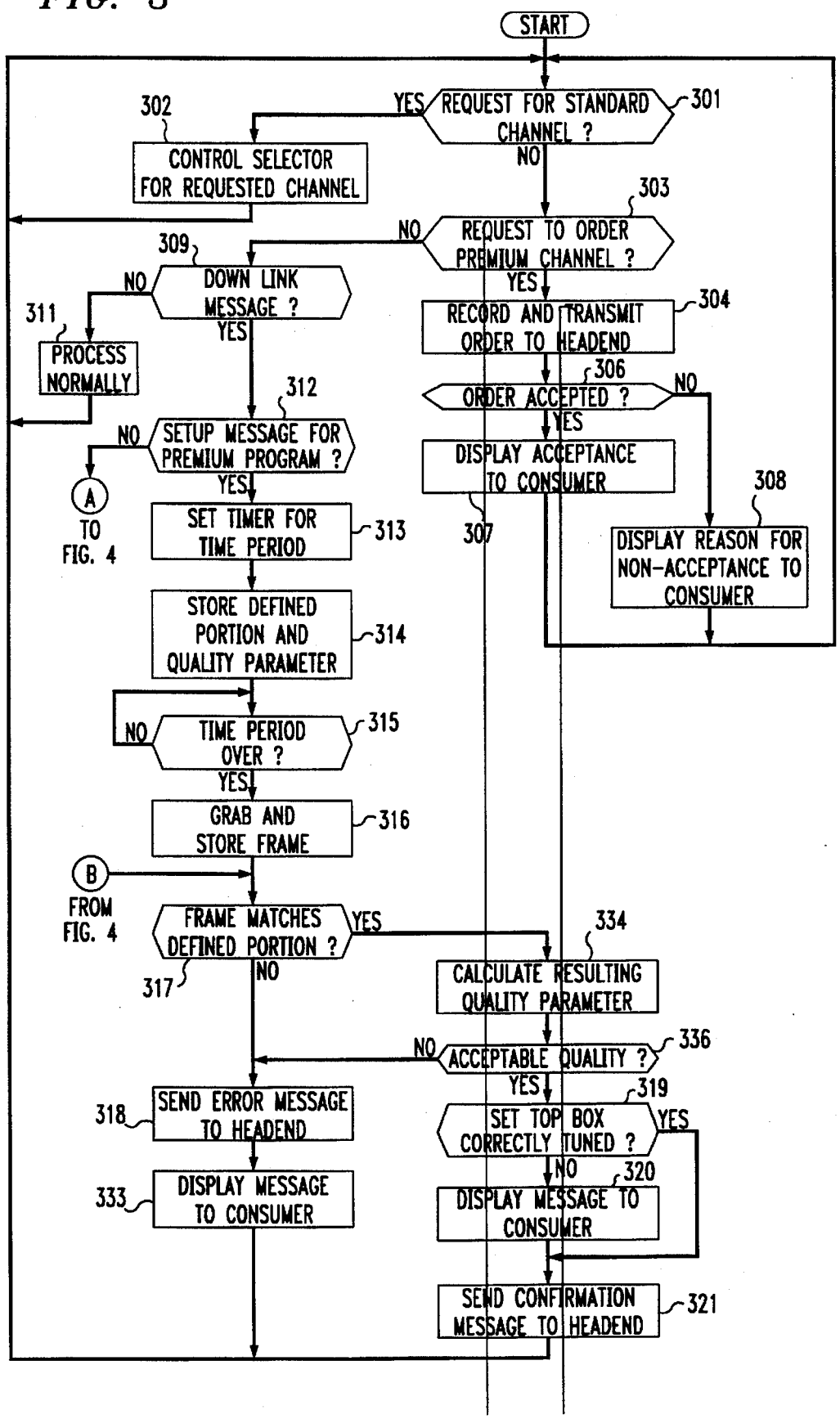
FIGS. 3 and 4 illustrates, in flow chart form, the operations performed by the controller in the set top box.
Figure 4:
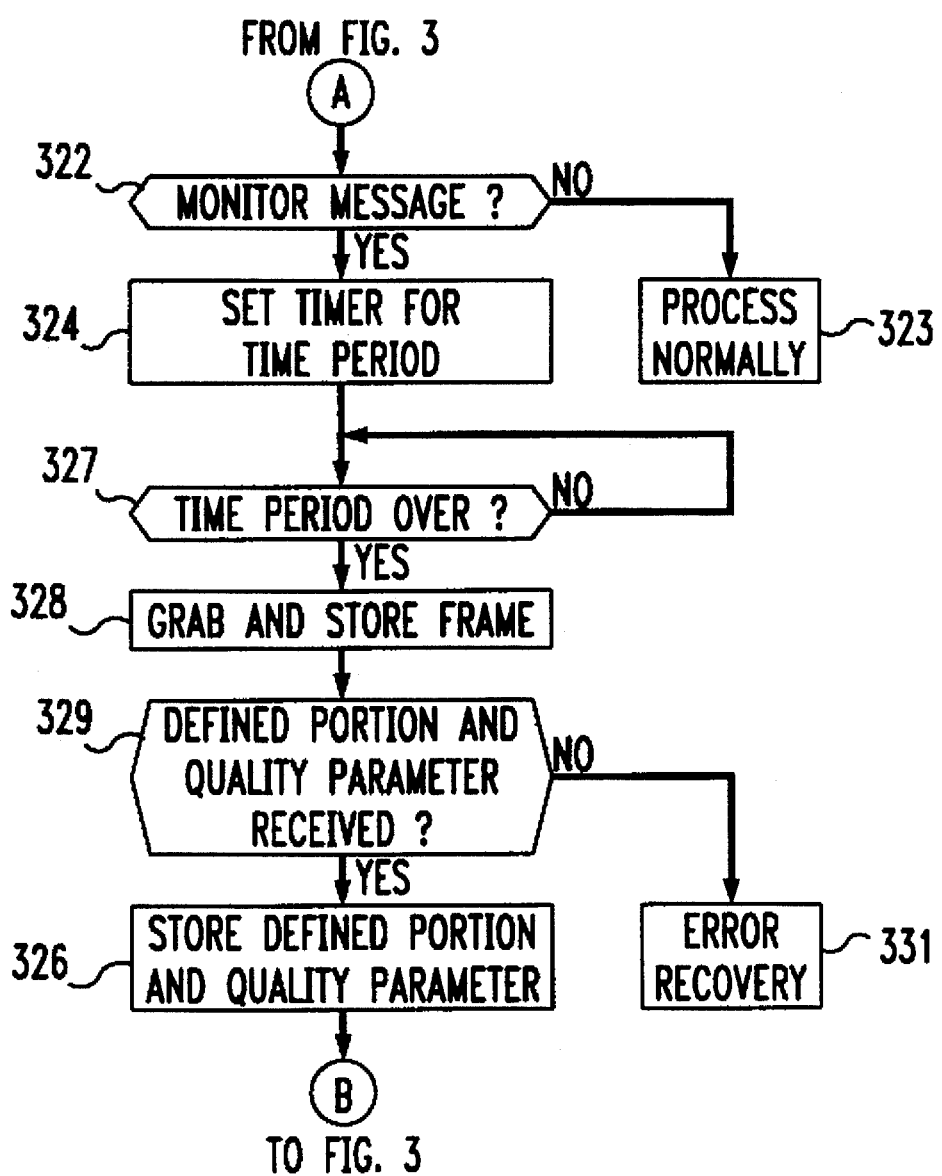

FIGS. 3 and 4 illustrates, in flow chart form, the operations performed by a set top box. Decision block 301 determines if the consumer has requested a standard channel by utilizing an IR remote transmitter to transmit a command to IR remote receiver 211 of FIG. 2. If the answer is yes, controller 207 sends signals to selector 206 via cable 218 to cause the selection and transmission of the requested standard channel to channel 3–4 modulator 208 via cable 222. If the answer in decision block 301 is no, decision block 303 determines whether the consumer is ordering a premium channel. If the answer is yes, block 304 records the order and transmits the order to the headend. Decision block 306 then waits for a downlink message from system computer 108 either accepting or denying the order. If the order is accepted, decision block 306 transfers control to block 307 which displays the acceptance of the order to the consumer. If the order is not accepted, decision block 306 transfers control to block 308 which displays the reason for nonacceptance of the order to the consumer.

Returning to decision block 303, if the answer is no, control is transferred to decision block 309. The latter decision block determines if a downlink message was received from system computer 108. If the answer is no, decision block 309 transfers control to block 311 which processes a command that is being received from the consumer in a normal manner. If the answer in decision block 309 is yes, control is transferred to decision block 312 which determines if the message is a setup message for a premium program. If the answer is yes, control is transferred to block 313 which sets an internal time for the time period specified in the message, and block 314 stores the defined portion of the premium program and the quality parameters. Control is then transferred from block 314 to decision block 315 which determines if the time period has expired. If the time period has expired, block 316 grabs and stores a frame. Next, decision block 317 determines if the grab frame matches the defined portion received in the setup message. If the answer is no, block 318 sends an error message to the headend. If the answer in decision block 317 is yes, block 334 calculates the resulting quality by calculating parameters on the frame grabbed by block 316. Decision block 336 then determines if the quality is acceptable by comparing the calculated parameters and the quality parameters transmitted from the headend. If the quality is not acceptable, control is transferred to block 318 which sends an error message to the headend and indicates that the quality is unacceptable. Block 333 then displays a message to the consumer stating "that the correct program is not being received or that the quality is unacceptable but steps are being taken to rectify the problem." If the answer in decision block 336 is yes, decision block 319 determines if the consumer has properly tuned the set top box to receive the premium program via the IR transmitter. If the answer is yes, block 321 sends a confirmation message to the headend indicating that the program is being correctly received. If the answer in decision block 319 is no, block 320 displays a message to the consumer indicating that they need to properly tune the set top box to the channel that has the premium program. Block 321 again sends a confirmation message to the headend but indicates in the message that the customer has not correctly tuned the set top box.

Returning to decision block 312, if the message is not a set up message, control is transferred to decision block 322 of FIG. 4 which determines if the message is a monitor message. System computer 108 may send out a monitor message some period of time after the set top box is receiving the premium program to assure that the premium program is still being received. In addition, system computer 108 can send a monitor message to a set top box if delivery problems are being experienced in the cable television network. This allows system computer 108 the ability to run diagnostic tests on the cable television network. If the message is not a monitor message, decision block 322 transfers control to block 323 which processes the message in a normal manner. If the message is a monitor message, block 324 sets a timer for the time period defined in the monitor message. Next, decision block 327 waits until the timer set in block 324 expires and then transfers control to block 328. The latter block grabs and stores a frame. Decision block 329 waits for the defined portion and quality parameters to be transmitted in a message from system computer 108. If that message is not received, control is transferred to block 331 for error recovery. If the message containing the defined portion and quality parameters is received, decision block 329 transfers control to block 326 which stores the defined portion and quality parameters. After execution of block 326, control is transferred to decision block 317 of FIG. 3 which has already been described.

Figure 5:
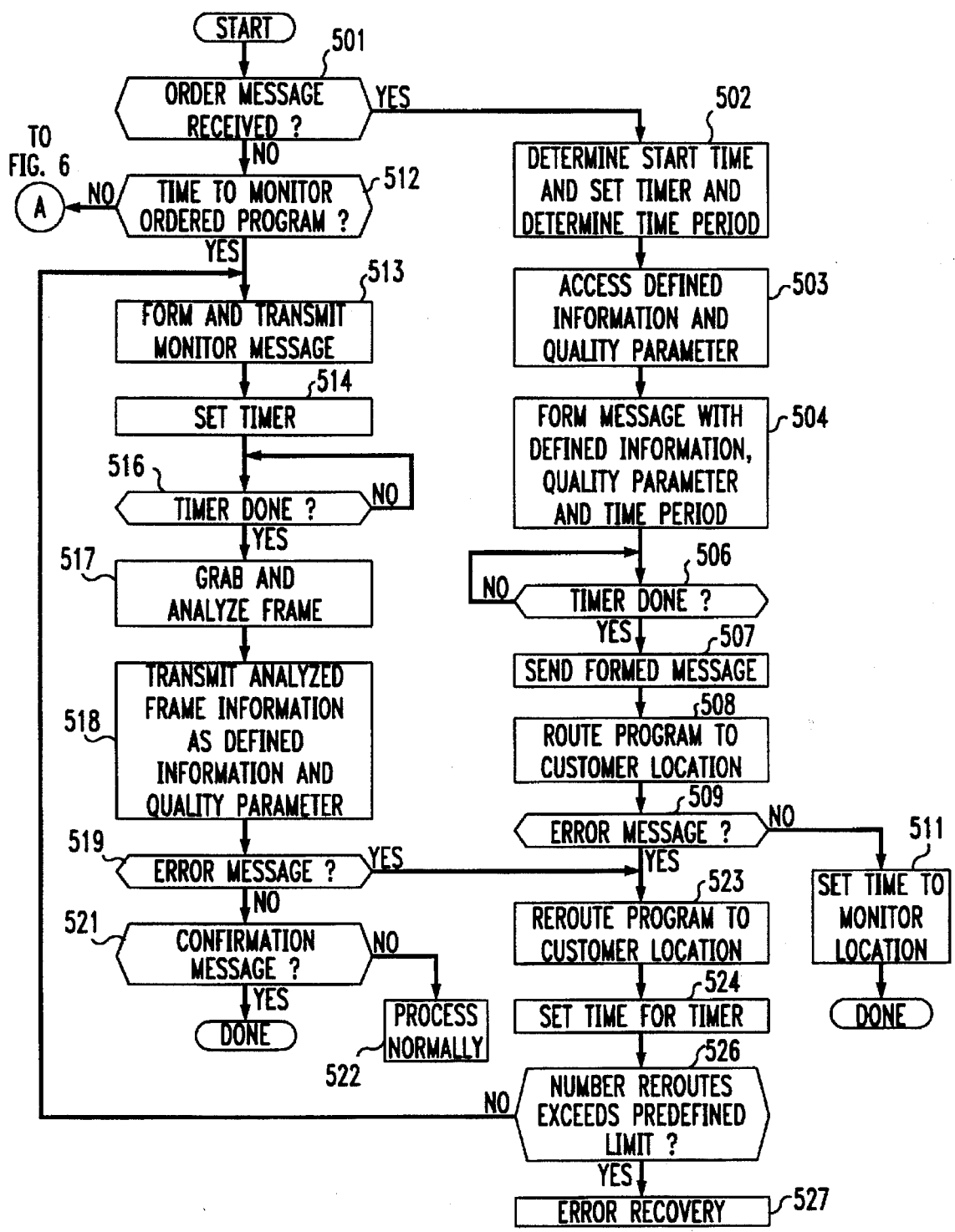
FIGS. 5 and 6 illustrates, in flow chart form, the operations with respect to program verification operations performed by a system computer.
Figure 6:
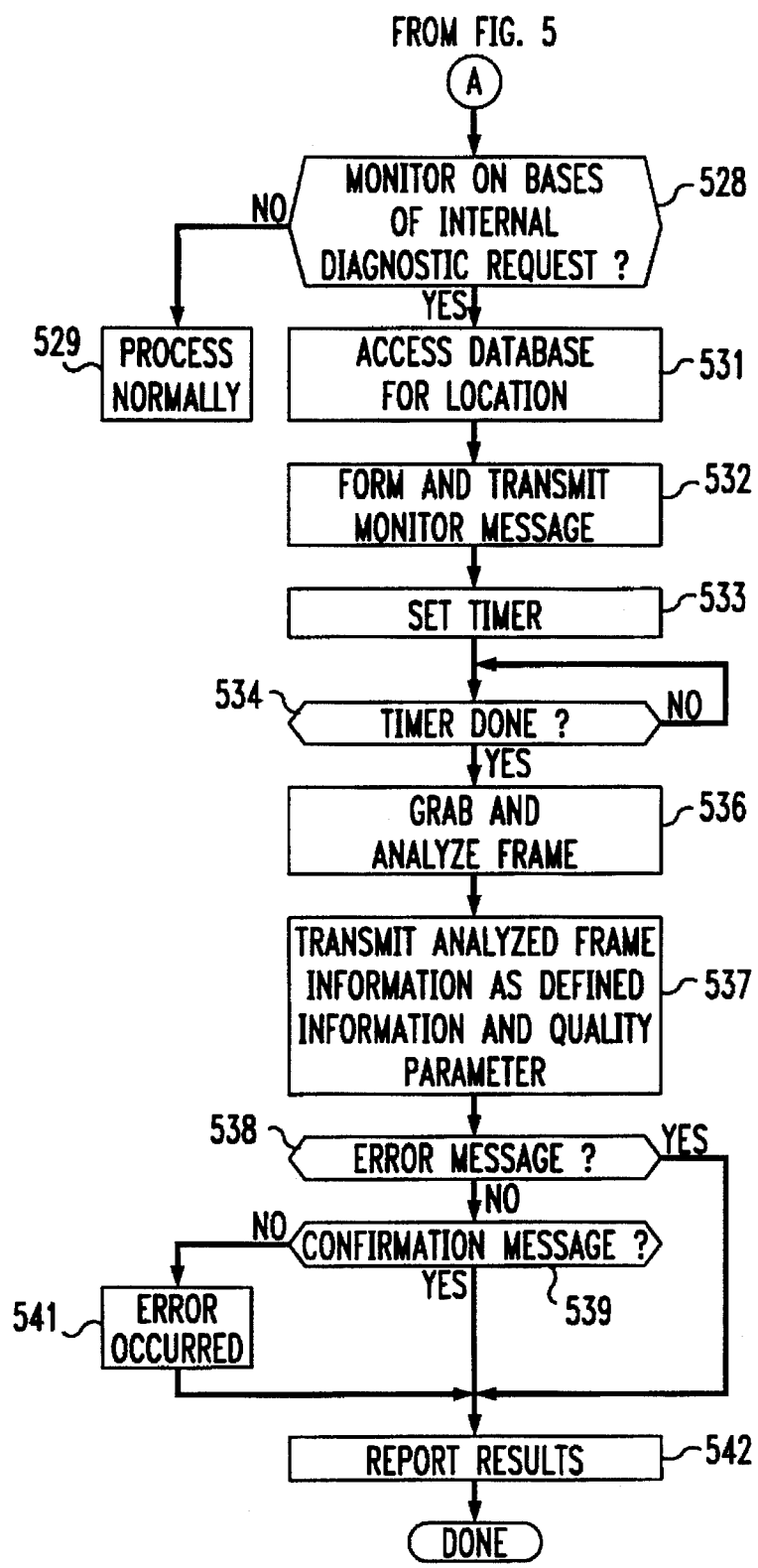

FIGS. 5 and 6 illustrates the operations performed by system computer 108 with respect to verification of premium programs at the site of the consumer. Decision block 501 determines if an order message has been received from a set top box. If the answer is yes, block 502 determines a start time for the program to begin and sets a timer for that start time. In addition, block 502 determines the time period for which the set top box should time for before trying to receive the premium program. Block 503 then accesses the defined information and quality parameters of the premium program. Block 504 then forms a message with the defined information, quality parameters, and the time period. Decision block 506 determines when the timer has expired and transfers control to block 507 which transmits the message to the set top box. Block 508 then sets up the routing of the program to the set top box. Decision block 509 determines if an error is received back from the set top box. If no error message is received back, block 511 sets a timer to the time for the monitoring of the program being delivered to take place. If an error message is received back, decision block 509 transfers control to block 523 which reroutes the program to the customer location. Block 524 sets the time for which a monitor message should be sent. Block 524 sets this to the minimum time. Decision block 526 determines if the number of times that the program has been attempted to be rerouted exceeds a predefined limit. If the answer is yes, control is transferred to block 527 for error control. If the answer is no in block 526, control is transferred to block 513 whose actions are described in the next paragraph.

Returning to decision block 501, if an order message was not received, control is transferred to decision block 512 which determines if it is time to monitor the programming being received by a set top box. If the answer is yes, control is transferred to block 513 which forms and transmits a monitor message. Block 514 then sets an internal timer to time when the frame should be grabbed in the headend equipment 101 and transmitted to the set top box. Decision block 516 determines when the timer expires. Upon expiration of the timer, block 517 in conjunction with headend equipment 101 grabs and analyzes a frame. The results of this analyzed frame are transmitted by block 518 to the set top box as the defined information quality parameters.

Decision block 519 then determines if an error message is received back from the set top box. An error message would indicate that the defined information did not match the frame grabbed by the set top box or that the received quality was poor. If the answer in decision block 519 is yes, control is transferred to block 523 whose operations were described in the previous paragraph. If the answer is no in decision block 519, decision block 521 determines if a confirmation message was received. If the answer is yes, the processing is complete. If the answer is no, block 522 performs normal processing.

Returning to decision block 512, if the answer is no, control is transferred to decision block 528 of FIG. 6. Decision block 528 determines if a request has been received to send a monitor message to a set top box from a diagnostic software routine executing in system computer 108. Such a routine requests monitor messages to be sent to a set top box if telephone calls were received from consumers complaining that they were not getting programming. The use of the monitor messages helps the diagnostic software routine identify which portions of the cable television network are failing. If the answer is no in decision block 528, block 529 performs normal processing. If the answer is yes in decision block 528, block 531 accesses an internal database to determine what program the set top box at the designated location is receiving. Block 532 then forms and transmits a monitor message to the designated set top box. Block 533 sets an internal timer. When the internal timer expires, decision block 534 transfers control to block 536 which grabs and analyzes a frame of the program being received by the designated set top box. Block 537 then transmits the analyzed frame information as the defined information and quality parameters to the set top box. Blocks 538, 539, and 541 determine what type of message is received back from the set top box. This information is utilized by block 532 to report the results of the monitor message to the diagnostic software routine that had requested transmission of the monitor message.

It is to be understood that the above-described embodiments are merely illustrative of the principles of the invention and that other arrangements may be devised by those skilled in the art without departing from the spirit and scope of the invention. In particular, communication by satellite could be utilized to replace the cable television network. Whereas, the user's control of set top box 111 has been described as being performed utilizing an IR remote transmitter, one skilled in the art could readily see that manual actuated buttons could also be mounted on set top box 111 for entering user commands. Further, one skilled in the art could readily see that the principles of the invention could be incorporated into a video cassette recorder (VCR) or another unit connected to the transmission system.

The invention claimed is:

1. An apparatus for assuring accurate transmission of video programs from a video switching system to customer sites via a transmission system where the video switching system is controlled by a system computer and each customer site has a service controller for receiving video programs for play back on a video set, comprising:

means for storing video information in the video switching system;

means for selecting a video program from the stored video information in the video switching system;

means in the switching system for transmitting the selected video program to a customer site via the transmission system after a predefined amount of time has lapsed;

means in the switching system for transmitting information defining the predefined amount of time and program identification information to the customer site via the transmission system before the transmission of the selected video program;

means in the service controller for capturing video frame information from the transmitted selected video program after the lapse of the predefined amount of time;

means in the service controller for matching the transmitted program identification information with the captured video frame information; and means in the service controller for transmitting an error message to the switching system upon the transmitted program identification information not matching the captured video frame information.

2. The apparatus of claim 1 further comprises means in the system computer responsive to the error message for reselecting the video program from the stored video information in the video switching system;

means in the switching system for transmitting other program identification information to the customer site;

means in the switching system for transmitting the reselected video program to the customer site via the transmission;

means in the service controller for capturing other video frame information from the transmitted reselected video program;

means in the service controller for matching the transmitted other program identification information with the other captured video frame information; and means in the service controller for transmitting another error message to the switching system upon the transmitted other program identification information not matching the other captured video frame information.

3. The apparatus of claim 2 wherein the means for capturing video frame information of the transmitted reselected video program comprises means for capturing the video frame information from an output of the service controller to the video set.

4. The apparatus of claim 3 wherein means in the switching system for transmitting the selected video program to the customer site via the transmission system comprises means for transmitting in one of a plurality of channels on the transmission system;

means in the switching system for transmitting information defining the predefined amount of time and program identification information further transmitting information identifying the one of the plurality of channels;

the means in the service controller for transmitting the error message to the switching system upon the transmitted program identification information not matching the captured video frame information comprises means for determining if the service controller is selecting the one of the plurality of channels; and the means in the service controller for transmitting the error message to the switching system upon the transmitted program identification information not matching the captured video frame information comprises means for transmitting a customer message to the video set upon the determination indicating that the service controller is not selecting the one of the plurality of channels whereby the customer message indicates that the service controller is not selecting the one of the plurality of channels.

5. The apparatus of claim 4 wherein the means in the service controller for transmitting the error message to the switching system upon the transmitted program identification information not matching the captured video frame information further responsive to the determination indicating that the service controller is not selecting the one of the plurality of channels to include information in the error message indicating that the service controller is not selecting the one of the plurality of channels.

6. The apparatus of claim 1 further comprises means in the system computer for monitoring the video program received at the customer site.

7. The apparatus of claim 6 wherein the means for monitoring comprises means for detecting when monitoring is to be performed;

mean for calculating other video program identification information and quality information; and means for requesting that the means for transmitting information transmit the other video program identification information and quality information to the service controller at the customer site.

8. The apparatus of claim 7 wherein the means in the service controller for capturing video frame information further responsive to the transmitted other video program identification information and quality information to capture other video frame information;

the means in the service controller for matching further responsive to the transmitted other video program identification information to match the other video program identification information with the captured other video frame information; and the means in the service controller for transmitting the error message further responsive to transmit another error message upon the transmitted other program identification information not matching the other captured video frame information.

9. The apparatus of claim 8 further comprises means in the service controller for calculating quality information for the captured other video frame information;

means in the service controller for comparing the calculated quality information for the captured other video frame information with transmitted quality information; and the means in the service controller for transmitting the error message further responsive to transmit information indicating unacceptable quality in the error message upon the means for comparing indicating that the calculated quality information is less than the captured other video frame information with transmitted quality information by a predefined amount.

10. A method for assuring accurate transmission of video programs from a video switching system to customer sites via a transmission system where the video switching system is controlled by a system computer and each customer site has a service controller for receiving video programs for play back on a video set, comprising:

storing video information in the video switching system;

selecting a video program from the stored video information in the video switching system;

transmitting by the switching system the selected video program to a customer site via the transmission system after a predefined amount of time has lapsed;

transmitting by the switching system information defining the predefined amount of time and program identification information to the customer site via the transmission system before the transmission of the selected video program;

capturing by the service controller video frame information from the transmitted selected video program after the lapse of the predefined amount of time;

matching by the service controller the transmitted program identification information with the captured video frame information; and transmitting by the service controller an error message to the switching system upon the transmitted program identification information not matching the captured video frame information.

11. The method of claim 10 further comprises the steps of reselecting the video program from the stored video information in the video switching system by the system computer responsive to the error message;

transmitting by the switching system other program identification information to the customer site;

transmitting by the switching system the reselected video program to the customer site via the transmission;

capturing by the service controller other video frame information from the transmitted reselected video program;

matching by the service controller the transmitted other program identification information with the other captured video frame information; and transmitting by the service controller another error message to the switching system upon the transmitted other program identification information not matching the other captured video frame information.

12. The method of claim 11 wherein the step of capturing video frame information of the transmitted reselected video program comprises the step of capturing the video frame information from an output of the service controller to the video set.

13. The method of claim 12 wherein the step of transmitting by the switching system the selected video program to the customer site via the transmission system comprises the step of transmitting in one of a plurality of channels on the transmission system;

the step of transmitting by the switching system information defining the predefined amount of time and program identification information further comprises the step of transmitting information identifying the one of the plurality of channels;

the step of transmitting by the service controller the error message to the switching system upon the transmitted program identification information not matching the captured video frame information comprises the step of determining if the service controller is selecting the one of the plurality of channels; and the step of transmitting by the service controller the error message to the switching system upon the transmitted program identification information not matching the captured video frame information comprises the step of transmitting a customer message to the video set upon the determination indicating that the service controller is not selecting the one of the plurality of channels whereby the customer message indicates that the service controller is not selecting the one of the plurality of channels.

14. The method of claim 13 wherein the step of transmitting by the service controller the error message to the switching system upon the transmitted program identification information not matching the captured video frame information further responsive to the determination indicating that the service controller is not selecting the one of the plurality of channels to include information in the error message indicating that the service controller is not selecting the one of the plurality of channels.

15. The method of claim 10 further comprises the step of monitoring by the system computer the video program received at the customer site.

16. The method of claim 15 wherein the step of monitoring comprises the steps of detecting when monitoring is to be performed;

calculating other video program identification information and quality information; and requesting that the step of transmitting information transmit the other video program identification information and quality information to the service controller at the customer site.

17. The method of claim 16 wherein the step of capturing by the service controller video frame information further responsive to the transmitted other video program identification information and quality information to capture other video frame information;

the step of matching by the service controller further responsive to the transmitted other video program identification information to match the other video program identification information with the captured other video frame information; and the step of transmitting by the service controller the error message further responsive to transmit another error message upon the transmitted other program identification information not matching the other captured video frame information.

18. The method of claim 17 further comprises the steps of calculating by the service controller quality information for the captured other video frame information;

comparing by the service controller the calculated quality information for the captured other video frame information with transmitted quality information; and the step of transmitting by the service controller the error message further responsive to transmit information indicating unacceptable quality in the error message upon the step of comparing indicating that the calculated quality information less is than the captured other video frame information with transmitted quality information by a predefined amount.

* * * * *